(12) United States Patent
Cormier

(10) Patent No.: US 11,399,516 B2
(45) Date of Patent: Aug. 2, 2022

(54) BEEHIVE FEEDER BARRIER ASSEMBLY

(71) Applicant: Darren Cormier, San Antonio, TX (US)

(72) Inventor: Darren Cormier, San Antonio, TX (US)

( * ) Notice: Subject to any disclaimer, the term of this patent is extended or adjusted under 35 U.S.C. 154(b) by 0 days.

(21) Appl. No.: 17/082,155

(22) Filed: Oct. 28, 2020

(65) Prior Publication Data
US 2022/0125024 A1  Apr. 28, 2022

(51) Int. Cl.
*A01K 47/06* (2006.01)
*A01K 53/00* (2006.01)

(52) U.S. Cl.
CPC .............. *A01K 47/06* (2013.01); *A01K 53/00* (2013.01)

(58) Field of Classification Search
CPC ................................ A01K 53/00; A01K 47/06
USPC ................................................. 449/9–11, 48
See application file for complete search history.

(56) References Cited

U.S. PATENT DOCUMENTS

| 126,229 | A | * | 4/1872 | Peck ....................... | A01K 53/00 449/48 |
| 1,056,266 | A | * | 3/1913 | Danzenbaker ......... | A01K 53/00 449/10 |
| 1,426,701 | A | * | 8/1922 | Achenbach ............ | A01K 53/00 449/10 |
| 1,435,118 | A | | 11/1922 | Heim | |
| 2,611,140 | A | * | 9/1952 | Goble ..................... | A01K 53/00 449/10 |
| 3,978,534 | A | | 9/1976 | Mihos | |
| 5,377,617 | A | | 1/1995 | Harwich | |
| 8,764,512 | B1 | | 7/2014 | Watson | |
| D826,481 | S | | 8/2018 | Waite | |
| 11,109,575 | B2 | * | 9/2021 | Stamets ................. | A01K 53/00 |
| 2014/0004770 | A1 | | 1/2014 | Nenninger | |
| 2018/0014514 | A1 | | 1/2018 | Freneaux | |
| 2018/0084763 | A1 | | 3/2018 | Sofano | |

FOREIGN PATENT DOCUMENTS

| DE | 2734517 A1 | * | 2/1979 | ............. A01K 53/00 |
| DE | 202015006458 U1 | * | 11/2015 | ............. A01K 47/06 |
| KR | 100417890 B1 | * | 2/2004 | |
| KR | 20170095084 A | * | 8/2017 | |

OTHER PUBLICATIONS

English-language translation of KR 20170095084 (Year: 2017).*

* cited by examiner

*Primary Examiner* — Lisa L Tsang

(57) ABSTRACT

A beehive feeder barrier assembly includes a barrier that is positionable between a beehive and an entry feeder that is integrated to the beehive. In this way the barrier can inhibit bees that do not occupy the beehive from accessing the entry feeder. The barrier forms a tunnel between the beehive and the entry-feeder when the barrier is positioned therebetween. In this way the barrier facilitates bees living in the beehive to travel back and forth between the entry feeder and the beehive. A pair of bumpers is provided and each of the bumpers is coupled to the barrier. Each of the bumpers engages the entry feeder when the barrier is positioned between the entry feeder and the beehive such that the bumpers inhibit the barrier from being displaced.

5 Claims, 4 Drawing Sheets

BEEHIVE FEEDER BARRIER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to barrier devices and more particularly pertains to a new barrier device for inhibiting foreign bees from entering a beehive and an entry feeder of the beehive.

(2) Description of Related Art Including Information Disclosed Under 37 CFR 1.97 and 1.98

The prior art relates to barrier devices including a beehive feeder that includes a tunnel extension that engages a beehive. The prior art also discloses a barrier device that is positionable between a beehive and a feeder which includes a mesh screen for inhibiting foreign bees from entering the beehive.

BRIEF SUMMARY OF THE INVENTION

An embodiment of the disclosure meets the needs presented above by generally comprising a barrier that is positionable between a beehive and an entry feeder that is integrated to the beehive. In this way the barrier can inhibit bees that do not occupy the beehive from accessing the entry feeder. The barrier forms a tunnel between the beehive and the entry-feeder when the barrier is positioned therebetween. In this way the barrier facilitates bees living in the beehive to travel back and forth between the entry feeder and the beehive. A pair of bumpers is provided and each of the bumpers is coupled to the barrier. Each of the bumpers engages the entry feeder when the barrier is positioned between the entry feeder and the beehive such that the bumpers inhibit the barrier from being displaced.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
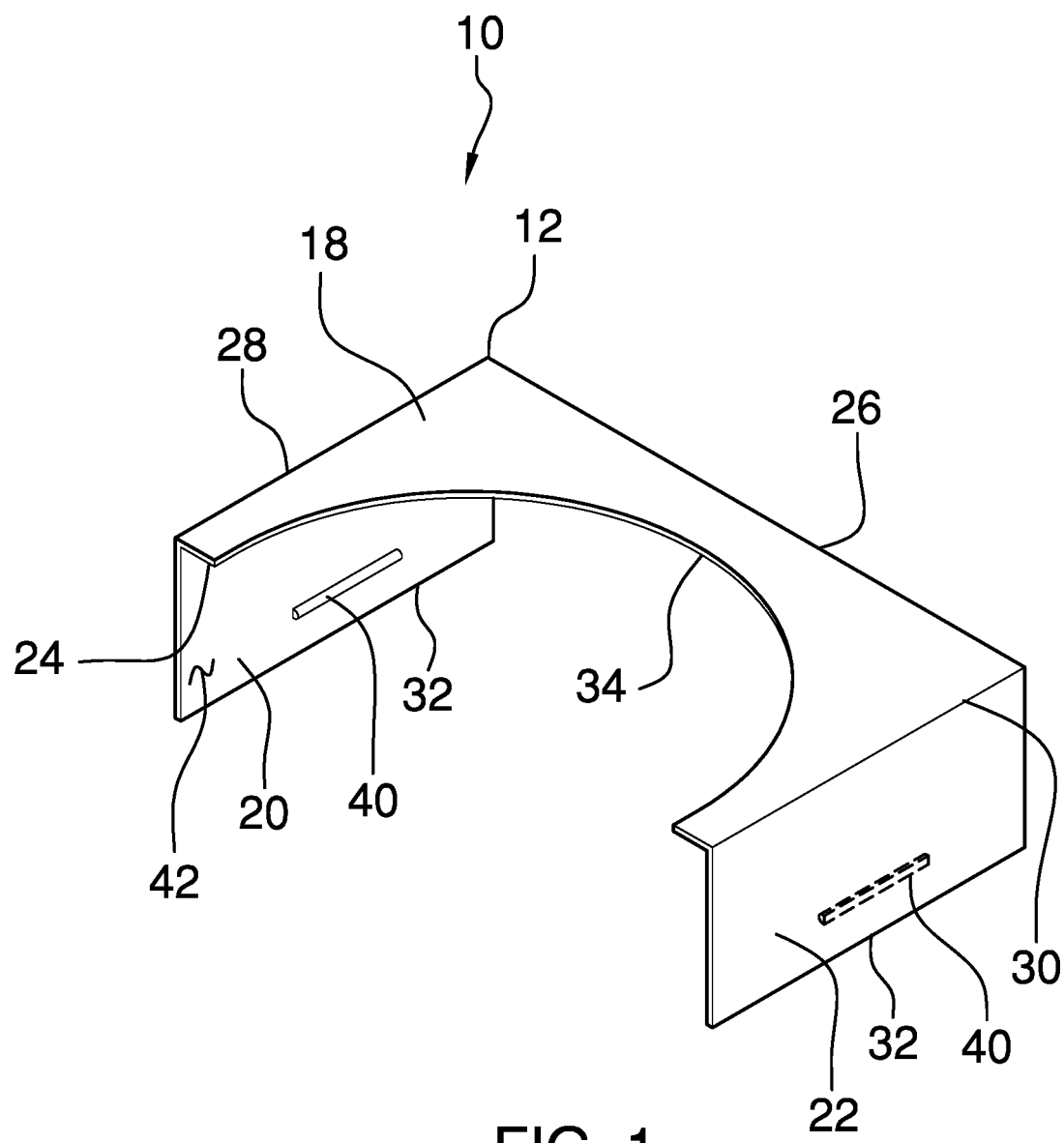
FIG. 1 is a top perspective view of a beehive feeder barrier assembly according to an embodiment of the disclosure.
Figure 2:
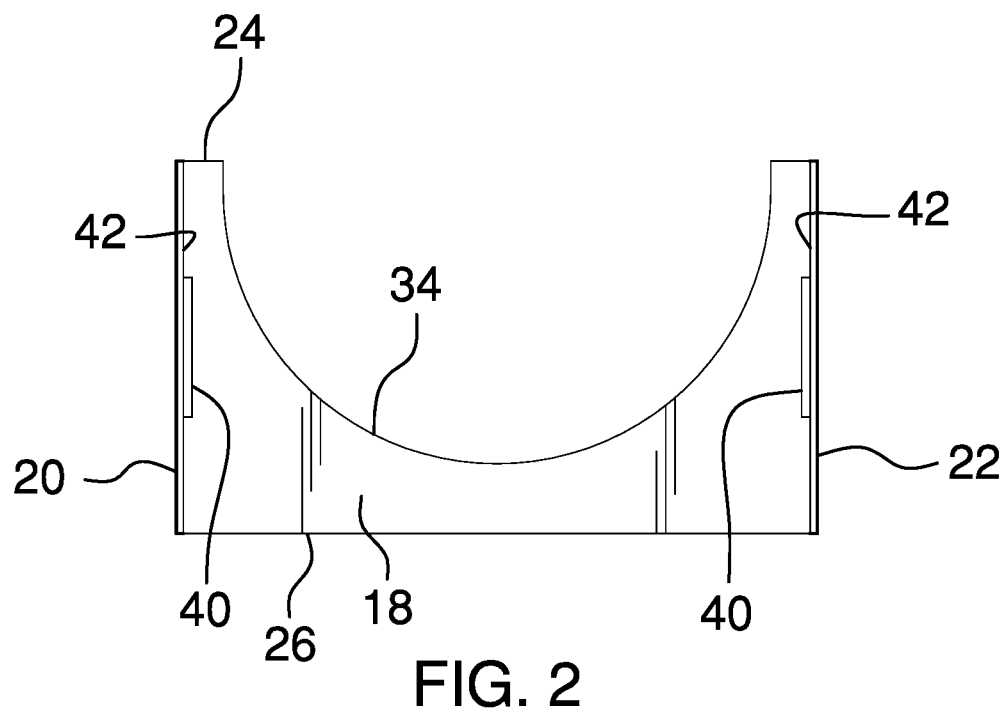
FIG. 2 is a bottom view of an embodiment of the disclosure.
Figure 3:
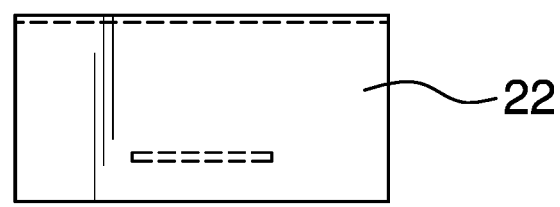
FIG. 3 is a right side phantom view of an embodiment of the disclosure.
Figure 4:
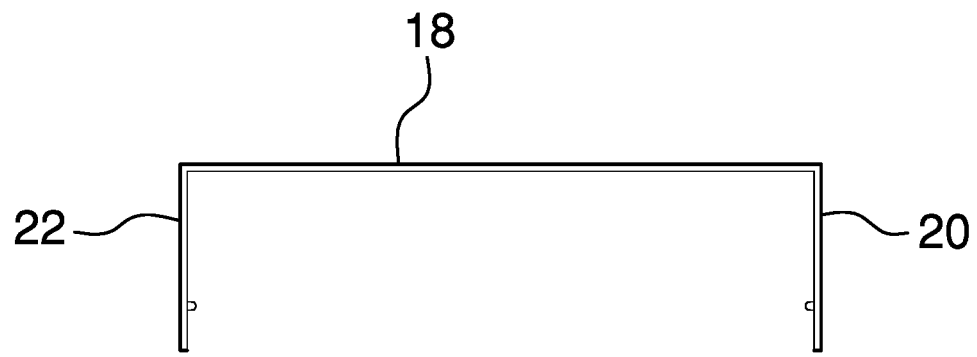
FIG. 4 is a back view of an embodiment of the disclosure.
Figure 5:
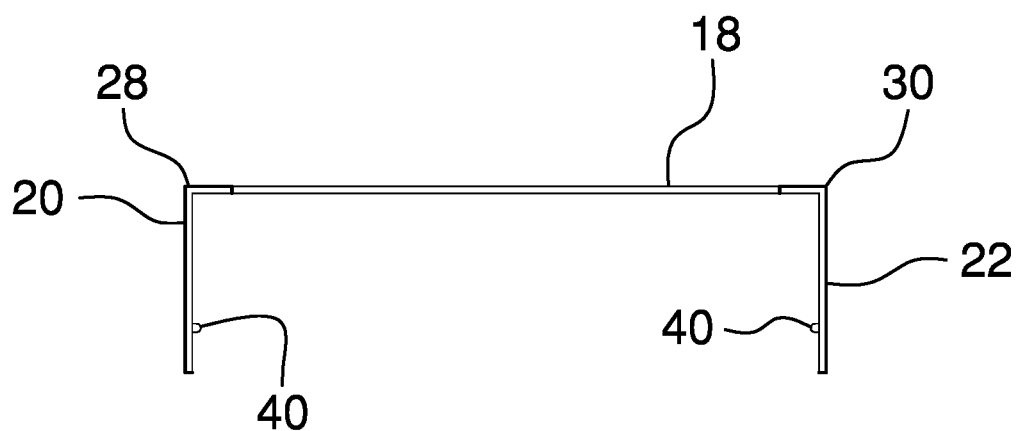
FIG. 5 is a front view of an embodiment of the disclosure.
Figure 6:
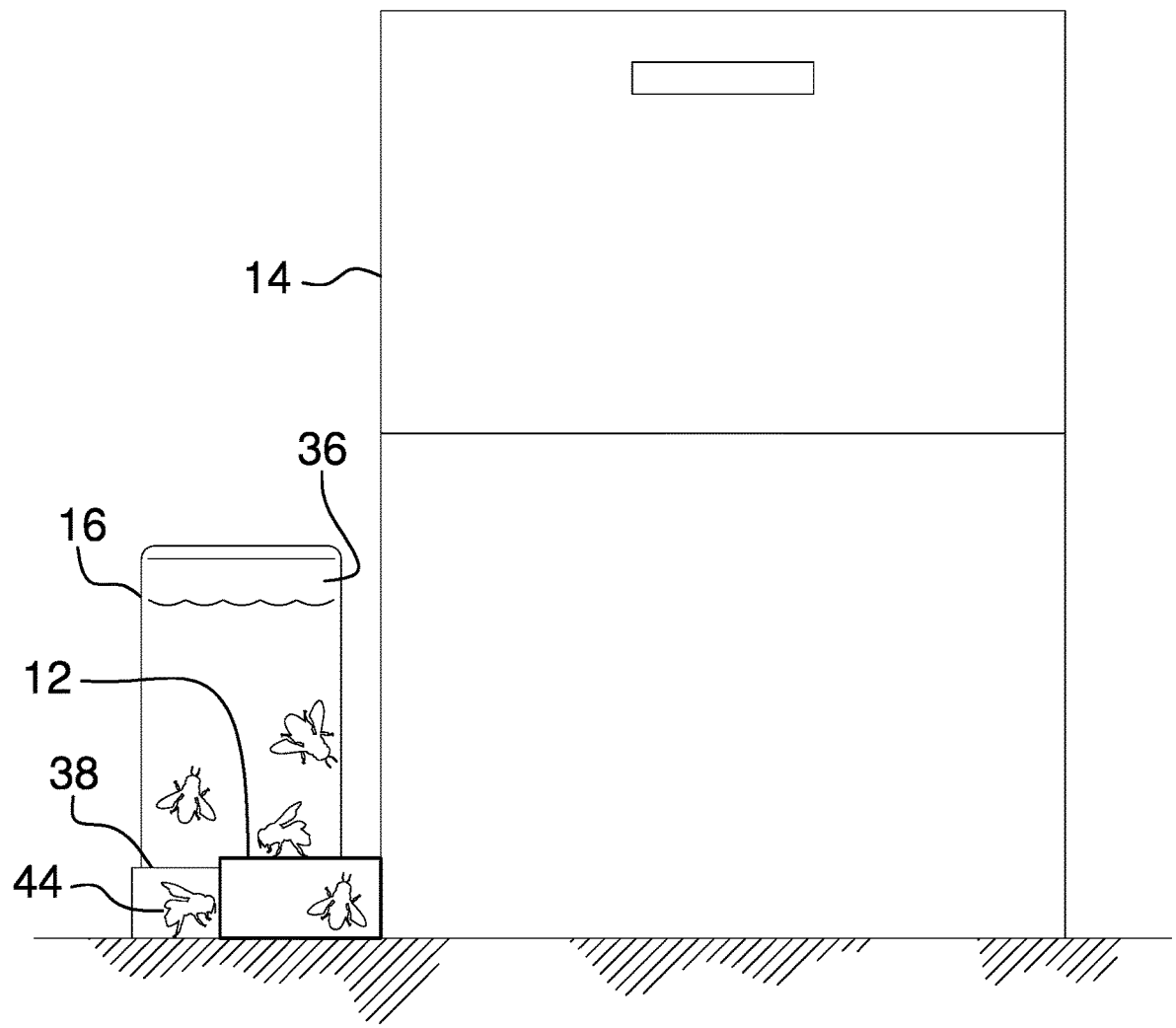
FIG. 6 is a perspective in-use view of an embodiment of the disclosure.

With reference now to the drawings, and in particular to FIGS. 1 through 6 thereof, a new barrier device embodying the principles and concepts of an embodiment of the disclosure and generally designated by the reference numeral 10 will be described.

As best illustrated in FIGS. 1 through 6, the beehive feeder barrier assembly 10 generally comprises a barrier 12 that is positionable between a beehive 14 and an entry feeder 16 that is integrated to the beehive 14. In this way the barrier 12 inhibits bees that do not occupy the beehive 14 from accessing the entry feeder 16. Thus, the overall health and safety of the bees that occupy the beehive 14 is enhanced. The beehive 14 may be box type beehive that is employed by a bee keeper and the entry feeder 16 may be a cylindrical entry feeder commonly employed by bee keepers.

The barrier 12 forms a tunnel between the beehive 14 and the entry feeder 16 when the barrier 12 is positioned therebetween. In this way the barrier 12 facilitated bees living in the beehive 14 to travel back and forth between the entry feeder 16 and the beehive 14. The barrier 12 has a top wall 18, a first lateral wall 20 and a second lateral wall 22, and the top wall 18 has a front edge 24, a back edge 26 a first lateral edge 28 and second lateral edge 30. Each of the first lateral wall 20 and the second lateral wall 22 extends downwardly from the top wall 18. Each of the first lateral wall 20 and the second lateral wall 22 has a distal edge 32 with respect to the top wall 18.

Each of the first lateral wall 20 and the second lateral wall 22 is aligned with a respective one of the first lateral edge 28 and the second lateral edge 30 of the top wall 18. Each of the first lateral wall 20 and the second lateral wall 22 extends between the front edge 24 and the back edge 26. The front edge 24 has a curved portion 34 that is concavely arcuate with respect to the back edge 26. The curved portion 34 conforms to curvature of a cylinder 36 of the entry feeder 16 when the barrier 12 is positioned between the entry feeder 16 and the beehive 14. Additionally, the curved portion 34 is centrally positioned between the first lateral edge 28 and the second lateral edge 30 of the top wall 18. The back edge 26 abuts the beehive 14 when the barrier 12 is positioned between the entry feeder 16 and the beehive 14. Each of the first lateral wall 20 and the second lateral wall 22 extends downwardly alongside a feeder tray 38 of the entry feeder 16 when the barrier 12 is positioned between the entry feeder 16 and the beehive 14.

A pair of bumpers 40 is provided and each of the barrier 12s is coupled to the barrier 12. Each of the bumpers 40 engages the entry feeder 16 when the barrier 12 is positioned between the entry feeder 16 and the beehive 14. In this way the bumpers 40 inhibit the barrier 12 from being displaced. Each of the bumpers 40 is positioned on an inside surface 42 of a respective one of the first lateral wall 20 and the second lateral wall 22 of the barrier 12. Additionally, each of the bumpers 40 is positioned closer to the distal edge 32 of the respective first lateral wall 20 or second lateral wall 22 than the top wall 18. Each of the bumpers 40 is elongated to extend substantially between the front edge 24 and the back edge 26 of the top wall 18. Additionally, each of the bumpers 40 is comprised of a resiliently compressible material thereby facilitating each of the bumpers 40 to compress against a respective side 44 of the feeder tray 38 of the entry feeder 16.

In use, the barrier 12 is positioned between the beehive 14 and the entry feeder 16 such that the barrier 12 forms the tunnel extending between the beehive 14 and the entry feeder 16. In this way the barrier 12 inhibits bees that do not live in the beehive 14 from accessing either the entry feeder 16 or the beehive 14. Thus, the barrier 12 enhances the health and safety of the bees the live in the beehive 14. Additionally, the barrier 12 facilitates the bees that live in the beehive 14 to travel between the entry feeder 16 and the beehive 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A beehive feeder barrier assembly for inhibiting bees from entering an entry feeder on a beehive and stealing food from the entry feeder, said assembly comprising:

a barrier being positionable between a beehive and an entry feeder integrated into the beehive, wherein said barrier is configured to inhibit bees that do not occupy the beehive from accessing the entry feeder, said barrier forming a tunnel between the beehive and the entry feeder when said barrier is positioned therebetween, wherein said barrier is configured to facilitate bees living in the beehive to travel back and forth between the entry feeder and the beehive; and a pair of bumpers, each of said bumpers being coupled to said barrier, each of said bumpers engaging the entry feeder when said barrier is positioned between the entry feeder and the beehive such that said bumpers inhibit said barrier from being displaced;

wherein said barrier has a top wall, a first lateral wall and a second lateral wall, said top wall having a front edge, a back edge, a first lateral edge and second lateral edge, each of said first lateral wall and said second lateral wall extending downwardly from said top wall, each of said first lateral wall and said second lateral wall having a distal edge with respect to said top wall, each of said first lateral wall and said second lateral wall being aligned with a respective one of said first lateral edge and said second lateral edge of said top wall, each of said first lateral wall and said second lateral wall extending between said front edge and said back edge; and wherein each of said bumpers is positioned on an inside surface of a respective one of said first lateral wall and said second lateral wall of said barrier, each of said bumpers being positioned closer to said distal edge of said respective first lateral wall or second lateral wall than said top wall, each of said bumpers being elongated to extend substantially between said front edge and said back edge of said top wall.

2. The assembly according to claim 1, wherein said front edge has a curved portion being concavely arcuate with respect to said back edge, said curved portion conforming to curvature of a cylinder of the entry feeder when said barrier is positioned between the entry feeder and the beehive, said curved portion being centrally positioned between said first lateral edge and said second lateral edge of said top wall, said back edge abutting the beehive when said barrier is positioned between the entry feeder and the beehive.

3. The assembly according to claim 1, wherein each of said first lateral wall and said second lateral wall extends downwardly alongside a feeder tray of the entry feeder when said barrier is positioned between the entry feeder and the beehive.

4. The assembly according to claim 3, wherein each of said bumpers is comprised of a resiliently compressible material thereby facilitating each of said bumpers to compress against a respective side of the feeder tray of the entry feeder.

5. A beehive feeder barrier assembly for inhibiting bees from entering an entry feeder on a beehive and stealing food from the entry feeder, said assembly comprising:

a barrier being positionable between a beehive and an entry feeder integrated into the beehive, wherein said barrier is configured to inhibit bees that do not occupy the beehive from accessing the entry feeder, said barrier forming a tunnel between the beehive and the entry feeder when said barrier is positioned therebetween, wherein said barrier is configured to facilitate bees living in the beehive to travel back and forth between the entry feeder and the beehive, said barrier having a top wall, a first lateral wall and a second lateral wall, said top wall having a from edge, a back edge, a first lateral edge and second lateral edge, each of said first lateral wall and said second lateral wall extending downwardly from said top wall, each of said first lateral wall and said second lateral wall having a distal edge with respect to said top wall, each of said first lateral wall and said second lateral wall being aligned with a respective one of said first lateral edge and said second lateral edge of said top wall, each of said first lateral wall and said second lateral wall extending between said from edge and said back edge, said front edge having a curved portion being concavely arcuate with respect to said back edge, said curved portion conforming to curvature of a cylinder of the entry feeder when said barrier is positioned between the entry feeder and the beehive, said curved portion being centrally positioned between said first lateral edge and said second lateral edge of said top wall, said back edge abutting the beehive when said barrier is positioned between the entry feeder and the beehive, each of said first lateral wall and said second lateral wall extending downwardly alongside a feeder tray of the entry feeder when said barrier is positioned between the entry feeder and the beehive: and a pair of bumpers, each of said bumpers being coupled to said barrier, each of said bumpers engaging the entry feeder when said barrier is positioned between the entry feeder and the beehive such that said bumpers inhibit said barrier from being displaced, each of said bumpers being positioned on an inside surface of a respective one of said first lateral wall and said second lateral wall of said barrier, each of said bumpers being positioned closer to said distal edge of said respective first lateral wall or second lateral wall than said top wall, each of said bumpers being elongated to extend substantially between said front edge and said back edge of said top wall, each of said bumpers being comprised of a resiliently compressible material thereby facilitating each of said bumpers to compress against a respective sides of the feeder tray of the entry feeder.

\* \* \* \* \*